US Patent [19]  Shimizu

[11] 4,169,360
[45] Oct. 2, 1979

[54] REFRIGERANT COMPRESSORS FOR AUTOMOTIVE AIR CONDITIONING REFRIGERATING SYSTEMS

[75] Inventor: Hideaki Shimizu, Isesaki, Japan

[73] Assignee: Sankyo Electric Company Limited, Isesaki, Japan

[21] Appl. No.: 906,403

[22] Filed: May 16, 1978

[30] Foreign Application Priority Data

May 16, 1977 [JP] Japan .................... 52-55470
Sep. 6, 1977 [JP] Japan .................... 52-106280

[51] Int. Cl.$^2$ .................... F25B 27/00; B60H 3/04
[52] U.S. Cl. .................... 62/323; 62/239; 62/243; 123/195 A; 417/313; 417/319
[58] Field of Search .................... 62/239, 243, 323 C, 62/323 B; 417/316, 354, 411, 319, 313; 123/195 A

[56] References Cited

U.S. PATENT DOCUMENTS

| | | | |
|---|---|---|---|
| 3,186,184 | 6/1965 | Pruitt | 62/323 C |
| 3,449,924 | 6/1969 | Sudmeier | 62/323 C |
| 3,759,058 | 9/1973 | Jacobs | 62/323 C |
| 4,095,922 | 6/1978 | Farr | 62/323 C |

Primary Examiner—Lloyd L. King
Attorney, Agent, or Firm—Hopgood, Calimafde, Kalil, Blaustein & Lieberman

[57] ABSTRACT

A refrigerant compressor for use in an automotive air conditioning refrigerating system is provided with an electromagnetic clutch and an AC electric generator assembled on the compressor. The electromagnetic clutch comprises a pulley rotatably mounted on the compressor housing to be driven by the engine of the car, a magnetic attracting surface, and a magnetic armature connected to a drive shaft of the compressor to be magnetically attracted to the magnetic attracting surface to selectively drive the compressor by the engine. The AC electric generator comprises a stator statically mounted on the compressor housing and a rotor mounted on the pulley. One of the stator and the rotor includes concentric magnetic pole pieces of permanent magnets or of electromagnets, and the other of the stator and rotor includes a coil member to which AC current is induced upon the rotation of the rotor together with the pulley. Electric power is obtained from the AC electric generator to compensate for the power consumption of the car battery in the use of the air conditioning refrigerating system.

8 Claims, 15 Drawing Figures

REFRIGERANT COMPRESSORS FOR AUTOMOTIVE AIR CONDITIONING REFRIGERATING SYSTEMS

BACKGROUND OF THE INVENTION

This invention relates generally to automotive air conditioning refrigerating systems, and, in particular, to a refrigerant compressor having an electromagnetic clutch for selectively coupling the compressor with an automobile engine.

It is conventional practice to drive the refrigerant compressor of an automotive air conditioning refrigerating system by the engine of the car. To this end, automobile air-conditioning system includes an electromagnetic clutch assembled on the refrigerating compressor. One of the clutch elements of the clutch includes a pulley coupled by a belt with the automobile engine of and is driven by the engine. When the other clutch element is magnetically attracted to the one of the clutch elements, the compressor is driven by the engine. Such an arrangement is described, for example, in U.S. Pat. Nos. 3,082,933 and 3,044,594.

As is known, a significant amount of electric power is consumed in the use of the automotive air conditioning refrigerating system to operate the electromagnetic clutch, blower, and other electric parts of the refrigeration system. This electric power is typically supplied from the car battery. Therefore, the use of the automobile air conditioning system often produces an undesired excessive load on the automobile battery.

In a typical automobile equipped with air conditioning, the electrical charging system for the battery, which is mounted on the car comprises an AC generator driven by the car, a rectifier, and a voltage controller. In the use of the automotive air conditioning refrigerating system, the usual electrical charging system may be insufficient to compensate for the substantial additional electric power consumption. Accordingly, an electric charging system of a high capacity must often be substituted for the usual electrical charging device of the car at the time of installation of the air conditioning refrigerating system. This adds significantly to the installing operation and to the cost of the system.

SUMMARY OF THE INVENTION

Therefore, an object of this invention is to provide a refrigerant compressor having an AC electric generator for used in automotive air conditioning refrigerating systems.

Another object of this invention is to realize foregoing object with a compact, simple and economical structure.

According to this invention, a refrigerant compressor with an electromagnetic clutch assembled thereon for an automotive air conditioning refrigerating system includes an AC electric generator which employs the rotation of a pulley that carries a clutch element of the electromagnetic clutch and which is driven by an engine of the car.

The AC electric generator comprises a coil device including a core and a permanent magnet device or an electromagnet device. One of the coil device and magnet device is mounted on the pulley to be rotated together with the pulley, and the other is statically mounted on the compressor housing. An AC current is induced in the coil of the coil device by the rotation of one of the coil device and the magnet device together with the pulley. The AC current is taken out and rectified by a rectifier. This rectified current can be used, for example, to charge the car battery.

According to one aspect of this invention the permanent magnet device mounted on the pulley comprises a plurality of permanent magnet elements arranged to form an annulus with the magnetic pole directions of adjacent two magnet elements being radially opposite to one another. The coil device is disposed in the rotary permanent magnet annulus and is statically mounted on the compressor housing. The coil device comprises an annular core formed with two annular yokes and an annular coil wound on the core. Each yoke is provided with a plurality of axial projections which extend over the radial outside of the coil, with each axial projection of one of the yokes being disposed between adjacent two axial projections of the other yoke.

The coil device may comprise a ring core having a plurality of radial projections and coils wound on respective radial projections. The coils are connected in series to one another and the induced AC current is taken out from leads connected to opposite ends of the coils connected in series.

According to another aspect of this invention, the electromagnet device mounted on the pulley comprises an annular core formed with a two annular yokes and an annular coil wound on the core. Each yoke is provided with a plurality of axial projections that extend over the radial outside of the coil, with each axial projection of one of the yokes being disposed between adjacent two axial projections of the other yoke. Electrical power is applied to the coil through brush means from a battery installed on the car. The coil device surrounds the annular electromagnet device and is statically secured onto the compressor housing. The coil device comprises a ring core having a plurality of radial outer projections and coils wound on respective radial projections. The coils are connected in series to one another and the induced AC current is taken out from leads connected to opposite ends of the coils connected in series.

Further objects, features and aspects of this invention will be understood from following descriptions in connection with preferred embodiments referring to the annexed drawings.

DETAILED DESCRIPTION OF PREFERRED EMBODIMENTS

Briefly stated, in the present invention an AC electric generator is assembled on a refrigerant compressor having an electromagnetic clutch which is used in an automotive air conditioning refrigerating system. A pulley of the clutch is coupled with the automobile engine and is always driven by the engine at a time when the engine operates. The AC power generated by this generator compensates for the substantial power consumption of the battery installed in the car.

Figure 1:
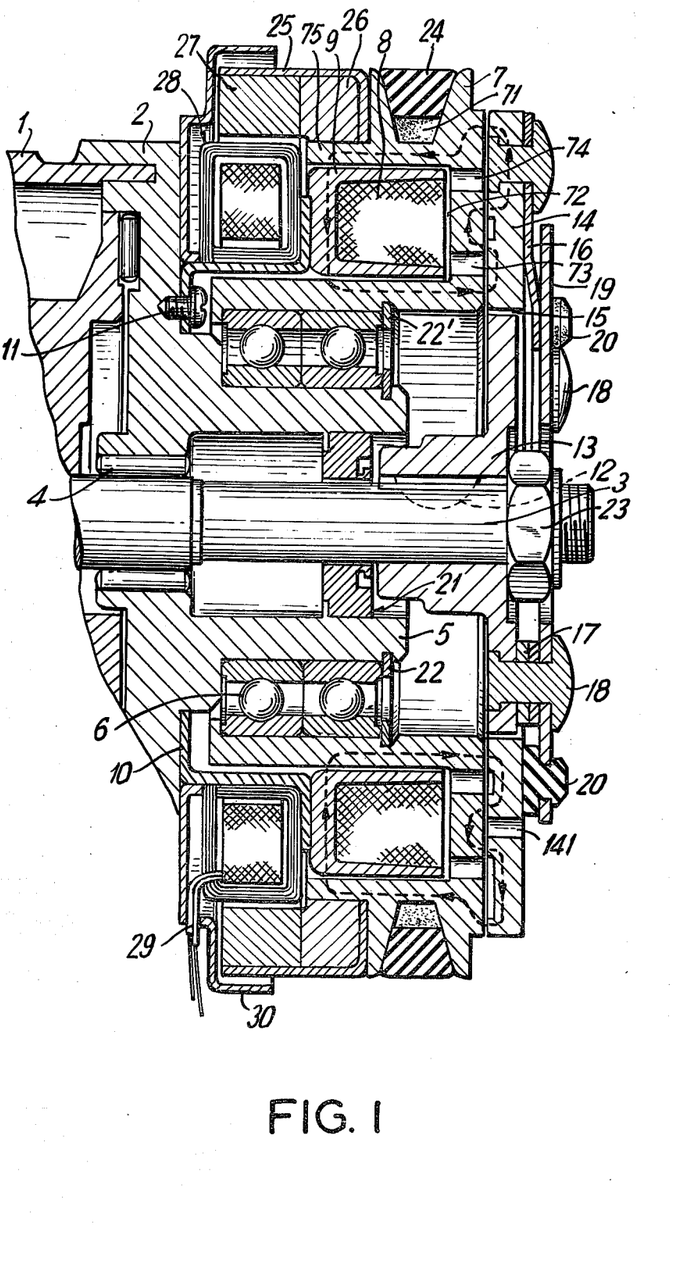
FIG. 1 shows a sectional view of a main part of an automotive air conditioner refrigerant compressor according to an embodiment of the invention.

Referring to FIG. 1, the embodiment of the refrigerant compressor according to the invention comprises a compressor housing 1, which includes a front end plate 2, and a rotatable driving shaft 3 which protrudes from, and is borne by a bearing 4 in the front end plate 2. The front end plate 2 is provided with a cantilever sleeve 5 extending therefrom surrounding and concentric with the driving shaft 3. Bearing members 6, two of which are shown, are mounted on the cantilever sleeve 5 by means of a snap ring 22 so that the inner bearing rings are fixed to the cantilever sleeve 5.

A rotating member or pulley 7 is supported on the bearing members by means of a snap ring so as to be rotatable together with the outer bearing rings.

The rotating member 7 is provided with a circumferential V-shape groove 71 formed in the circumferential outer surface thereof, and an annular groove 72 formed in the end surface thereof opposite to the front end plate 2.

An annular coil 8 is disposed in the annular groove 72 of the rotating member 7. The coil 8 is contained in an annular coil housing 9 made of a magnetic substance, such as a steel, having a U-shape section. Housing 9 is supported on a supporting member 10 which is secured by screws 11 to the front end plate 2.

Thus, the coil housing 9 including the coil 8 is statically disposed in the annular groove 72 of the rotating member 7 in such a fashion that annular air gaps are maintained between the rotating member 7 and the coil housing 9.

A hub 13 is mounted on an extending end of the driving shaft 3 by means of a key 12 and a nut 23 to rotate together with the driving shaft. A ring plate 14 is disposed concentric with the hub 13 with an annular gap 15 therebetween and is connected and supported by leaf springs 16 to the hub 13. Thus, the ring plate 14 faces the end surface of the rotating member 7 at the opposite side of the annular groove 72 thereof with an air gap therebetween.

The leaf springs 16 are secured to the hub 13 by means of rivets 18 together with a stopper plate 19. The stopper plate 19 carries elastic members 20 made of a material such as rubber to provide an initial deformation to, or bias, the leaf springs 16 to determine the axial air gap between the rotating member 7 and the ring plate 14.

The rotating member 7 is formed of a magnetic material, for example, a steel, and has a plurality of, for example, three, arcuate slots 73 arranged along an imaginary circle, and a plurality of, for example, three, arcuate slots 74 arranged along a concentric imaginary circle, which arcuate slots are formed in the axial end portion thereof in the bottom portion of the annular groove 72. As a result, the rotating member 7 is magnetically separated into three sections by the slots 73 and 74.

The ring plate 14 supported on the hub 13 by leaf springs 16 is also formed of a magnetic material such as a steel, and has a plurality of, for example, three, arcuate slots 141 arranged along an imaginary circle. Therefore, the ring plate 14 is magnetically separated into two sections by the slots 141. The radial position of the slots 141 is determined between the slots 73 and the slots 74 of the rotating member 7.

Within the cantilever sleeve 5, a shaft seal assembly 21 is mounted on the drive shaft 3 extending in the sleeve.

The pulley, or the rotating member 7, is coupled with an automobile engine (not shown) by an endless V-belt 24 and a pulley mounted on a rotating shaft of the engine, and is rotated by the engine.

During a time when the coil 8 is not energized, only the rotating member 7 is driven by the engine.

On the other hand, when the coil 8 is energized, magnetic flux is induced and flows as indicated by the broken arrow line shown in FIG. 1, through a closed loop comprising coil housing 9, pulley 7, ring plate 14, pulley 7 and coil housing 9. As a result, the ring plate 14 is magnetically attracted to the pulley 7 and rotates together with the pulley. Thus, the driving shaft 3 is rotated, because the ring plate 14 is connected to the hub 13 by leaf springs 16, which hub is connected to the driving shaft 3. As a result, the refrigerant compressor is driven.

As will be understood from the above description, an electromagnetic clutch is constituted with the rotating member or pulley 7, the ring plate 14 and the coil housing 9 including the coil 8.

Figures 2, 3, 4:
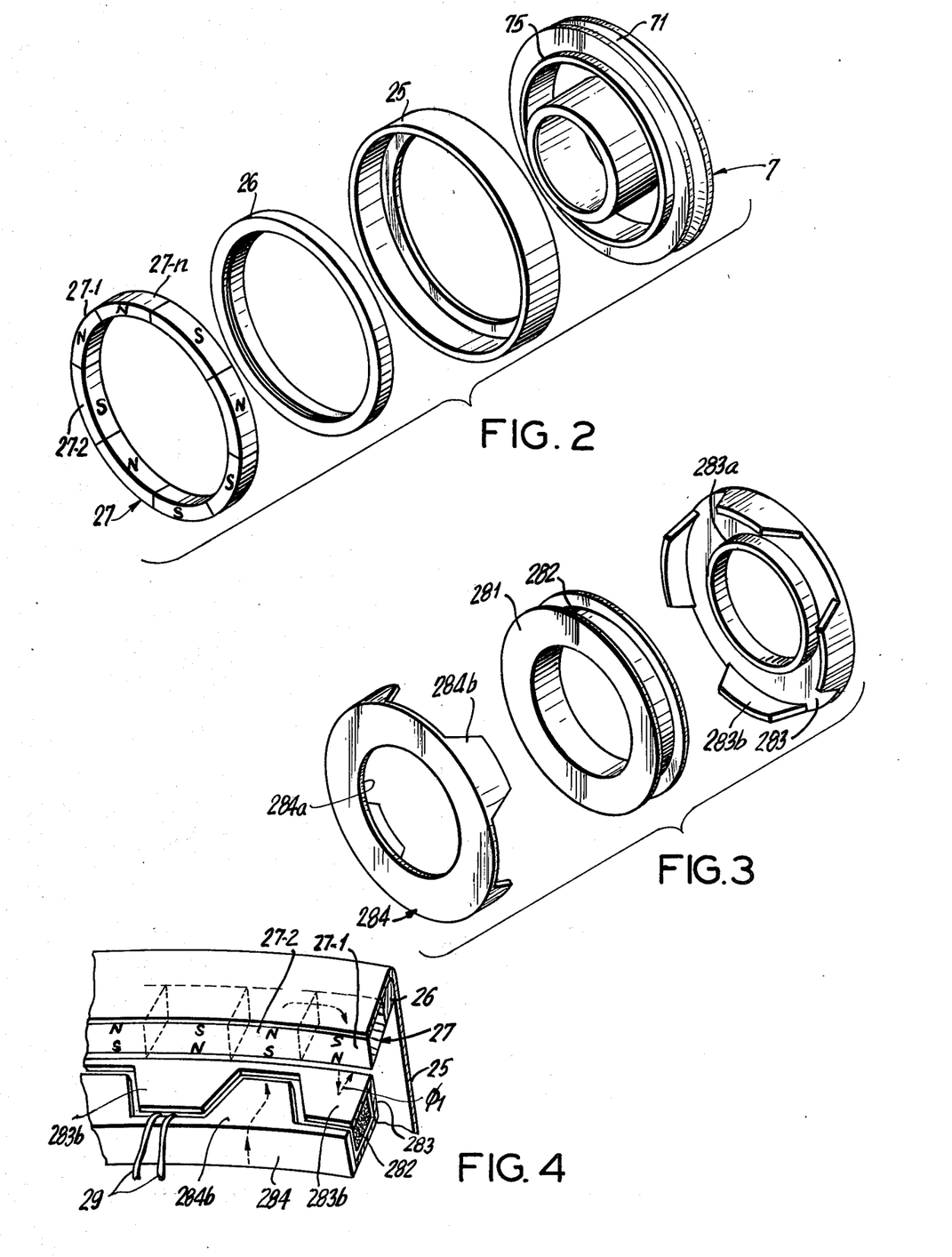
FIG. 2 is a perspective view of a permanent magnet device or a rotor in the compressor of FIG. 1, shown in a disassembled form.
FIG. 3 is a perspective view of a coil device or a stator in the compressor of FIG. 1, shown in a disassembled form.
FIG. 4 is a partial perspective view of the rotor and the stator in the compressor of FIG. 1 for explaining the electric generation thereby.

Referring to FIG. 2 as well as FIG. 1, the rotating member 7 is provided with an axial flange portion 75, on which an annular magnet holder 25 of a magnetic material, such as a steel, is fitted and fixed by means of spot welding or screws. The magnet holder 25 contains an annular permanent magnet device 27 together with a magnetic shielding ring 26 made of a non-magnetic material. Therefore, the annular magnet holder 25, shielding ring 26 and permanent magnet device 27 rotate together with the pulley 7.

The permanent magnet device 27 comprises a plurality of permanent magnet elements 27-1, 27-2, . . . , and 27-n which are arranged to form an annular body, with the magnetic pole direction of each magnet element being in the radial direction of the annular body adjacent magnet elements in magnet device 27 are in the opposite direction to one another in the magnetic pole direction.

The permanent magnet device 27 may be made of a plurality of permanent magnet members, or, alternatively, of an annular magnetic piece which is magnetized in different directions at sections thereof.

An annular coil device 28 (FIG. 1) is disposed at the radially inner side of the annular permanent magnet device 27, is also secured to, and supported by, the supporting member 10.

Referring to FIG. 3, the coil device 28 comprises a dielectric coil bobbin 281, a coil 282 wound by several hundred turns on the bobbin 281, and a pair of yoke members 283 and 284 which are formed of a laminated magnetic plate.

The yoke 283 is a ring like plate having a cylindrical flange 283a axially extending from the radial inner end thereof and a plurality of axial projecting tabs 283b at the radial outer edge thereof and at angularly spaced positions. The other yoke 284 is also a ring like plate having a plurality of axial projecting tabs 284b at the radial outer edge thereof and at angularly spaced positions.

The bobbin 281 is mounted on the cylindrical flange 283a of the yoke 283, and the extending end of the flange 283a is fixed to the radial inner edge 284a of the other yoke 284. As shown, each tab 283b of the yoke 283 is disposed between adjacent two tabs 284a with air gaps therebetween. As a result, both yokes 283 and 284 form a housing of the coil 282.

It will be understood from the following description that the annular permanent magnet device 27 and the annular coil device 28 make up an AC electric generator wherein the former serves as a rotor of the generator and the latter serves as a stator.

The rotation of an magnet body 27 induces the AC current in the coil 282 this AC current is obtained from leads 29 which are led out from the coil 282 to the outside of the coil device 28.

This AC current may be rectified by a rectifier and used, for example, for charging the battery of the car.

A protector cover 30 may be provided, as shown, to protect the coil device 28 from dust.

Referring to FIG. 4, the electric generation by the annular permanent magnet device 27 and the coil device 28 is described in detail.

For purposes of this explanation it is assumed that the N-pole of a magnet element 27-1 faces a tab 283b of the magnetic yoke 283, and the S-pole of the adjacent magnet element 27-2 faces the adjacent tab 284b of the magnetic yoke 284. In this case, magnetic flux $\phi_1$ flows from the N-pole of the magnet element 27-1 to the S-pole of the adjacent magnet element 27-2 through the tab 283b, cylindrical flange 283a and the tab 284b, as indicated by the broken arrow line in FIG. 4. The magnetic flux from the N-pole of the magnet element 27-2 flows to the S-pole of the adjacent magnet element 27-1 through the magnet holder 25.

Relating to each adjacent two magnet elements 27-2 and 27-3, 27-3 and 27-4, . . . , or 27-n and 27-1, and each adjacent tabs 283b and 284b, similar magetic flux flow is made up so that the coil 282 of the coil device is surrounded by magnetic flux in an axial direction at an inner side of the coil.

Next, it is assumed that, due to the rotation of the magnet body 27, the N-pole of the magnet element 27-1 faces the adjacent tab 284b with the S-pole of the magnet element 27-2 facing another adjacent tab 283b of the yoke 283. The magnetic flux from the N-pole of the magnet element 27-1 now flows through the tab 284b, the cylindrical flange 283a and the tab 283b to the S-pole of the magent element 27-2. The magnetic flow direction is inverse in comparison with the previous state. Accordingly, it will be understood that an AC current is induced in the coil 282 by the rotation of the permanent magnet device 27, because the magnetic flux direction is alternatingly changed between two inverse directions.

As will be understood from above description, the number of the magnet elements on the permanent magnet device is equal to the total number of axial tabs 283b and 284b.

Figure 5:
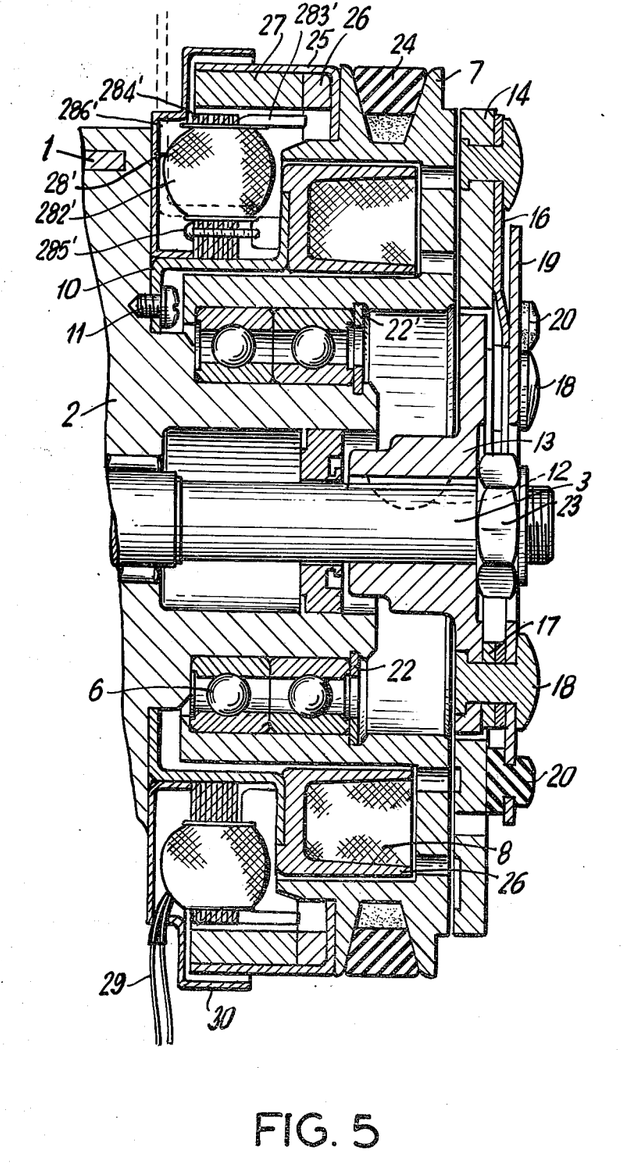
FIG. 5 is a sectional view of a main part of a refrigerant compressor according to another embodiment of the invention.

The embodiment of the invention illustrated in FIG. 5 is similar as the embodiment described in connection with FIGS. 1-4, except for the coil device or stator of the AC electric generator. Therefore, the description of the structures in the embodiment of FIG. 5 other than the coil device 2840 is omitted for simplification of description. Similar parts in the two embodiments are represented by same reference characters as in FIGS. 1-4.

The coil device 28' comprises a ring like magnetic yoke 283' which is fixed to the supporting member 10 by means of welding or other fixing means, a laminated ring like yoke 284' which is superposed to and secured to the yoke 283' by bolt means 285', and coils 282' wound on the yokes 283' and 284' through insulator layers 286'.

Figure 6A:
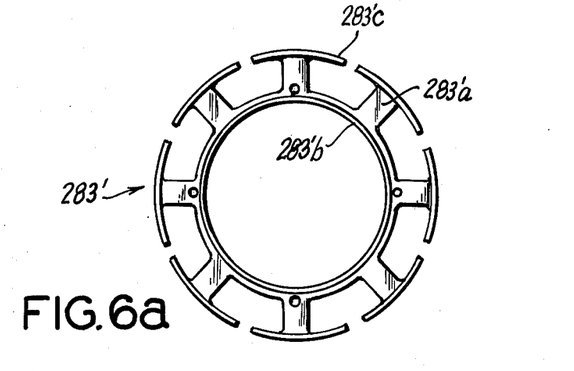
FIGS. 6a and 6b are respectively a front view and a side view of a yoke used in a coil device or a stator in the compressor FIG. 5.
Figure 6B:
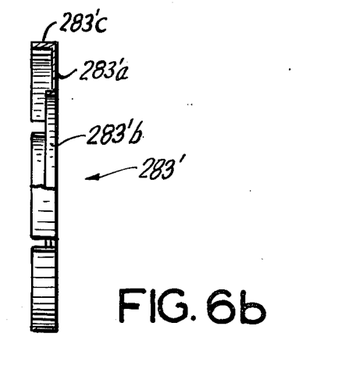

Referring to FIGS. 6a and 6b, the yoke 283' which is made of a magnetic material is in the form of a ring plate having a plurality of angularly spaced radial fingers 283'a and a cylindrical axial flange 283'b extending from the radial inner edge of the ring plate. At the radial outer end of each finger 283'a, an arcuate plate of a magnetic material 283'c is connected. The outer surfaces of all of the arcuate plates make an imaginary cylindrical surface having a slightly smaller diameter than the inner diameter of the permanent magnet device 27, with adjacent two arcuate plates establishing an air gap therebetween.

Figure 7A:
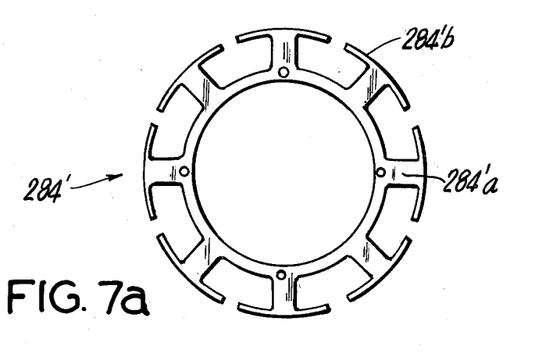
FIGS. 7a and 7b are respectively a front view and a side view of another yoke used in the stator in the compressor of FIG. 5.
Figure 7B:
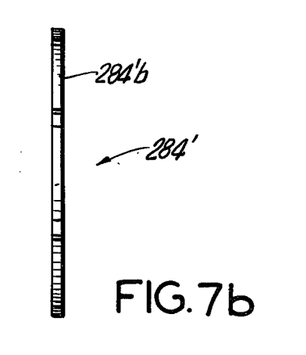

FIGS. 7a and 7b illustrate another laminated yoke 284' which comprises a plurality of ring plates. Each ring plate has a plurality of angularly spaced radial fingers 284'a, each of which has two projections 284'b which extend in opposite directions from the radial outer end thereof towards adjacent fingers.

The number of fingers 283'a of the yoke 283' is equal to the number of fingers 284'a of the yoke 284' as well as the number of magnet elements of the permanent magnet device 27.

The laminated yoke 284' is superposed onto the yoke 283' and is secured thereto by means of bolts 285' to form a stator core. Radial fingers 283'a and 284'a make pole pieces of the stator.

Figure 8:
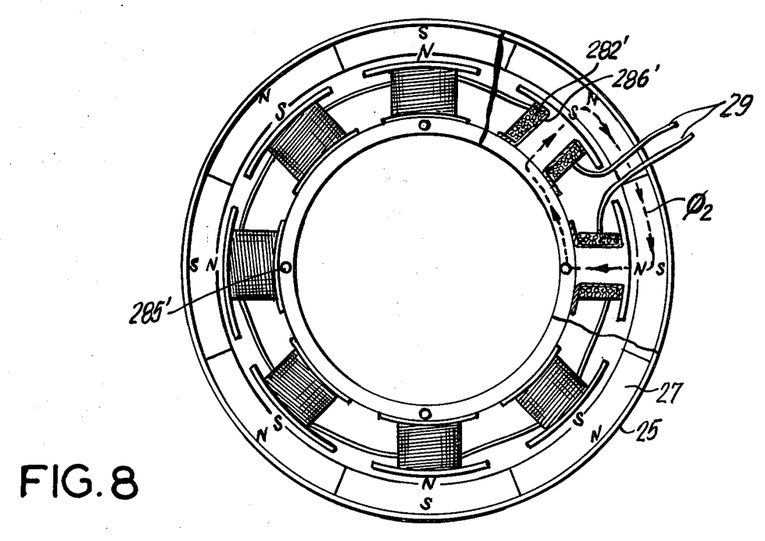
FIG. 8 is a front view of an AC generator comprising the rotor and the stator in the compressor of FIG. 5.

Referring to FIG. 8, coil 282' is wound on each pole piece which is covered by an insulator paper 286'. All coils wound on pole pieces are connected in series, and opposite ends are led out as leads 29.

Assuming that a pole piece faces an S-pole of a magnet element of the permanent magnet device 27, and the adjacent pole piece faces an N-pole of the adjacent magnet element the magnetic flux $\phi_2$ flows through the adjacent two pole pieces as indicated by the broken arrow line in FIG. 8.

Next, when the pole piece which faced the S-pole of a magnet element faces the N-pole of the next magnet element due to the rotation of the permanent magnet device 27, the adjacent pole piece which faced the N- pole of a magnet element now faces the S-pole of the adjacent magnet element. Therefore, the magnetic flux flows in a reverse direction in comparison with the previous state. It will thus be understood that the direction of the magnetic flux which flows through each pole piece of the stator 283'-284' is alternatingly changed between two opposite directions due to the rotation of the permanent magnet device 27. As a result, AC current is induced on the coil wound on each pole piece. The AC current is taken out from the leads 29 and is rectified to be used, for example, to charge the car battery.

In the above described embodiments, the permanent magnet device 27 is mounted on the rotating member 7 of the clutch, with the coil device 28 being statically mounted. But it will be apparent to those skilled in the art to make a modification wherein the permanent magnet device is statically mounted, and the coil device mounted on the rotating element. In this modification, a brush means should be provided for taking out the induced current from the rotating coil device.

Figure 9:
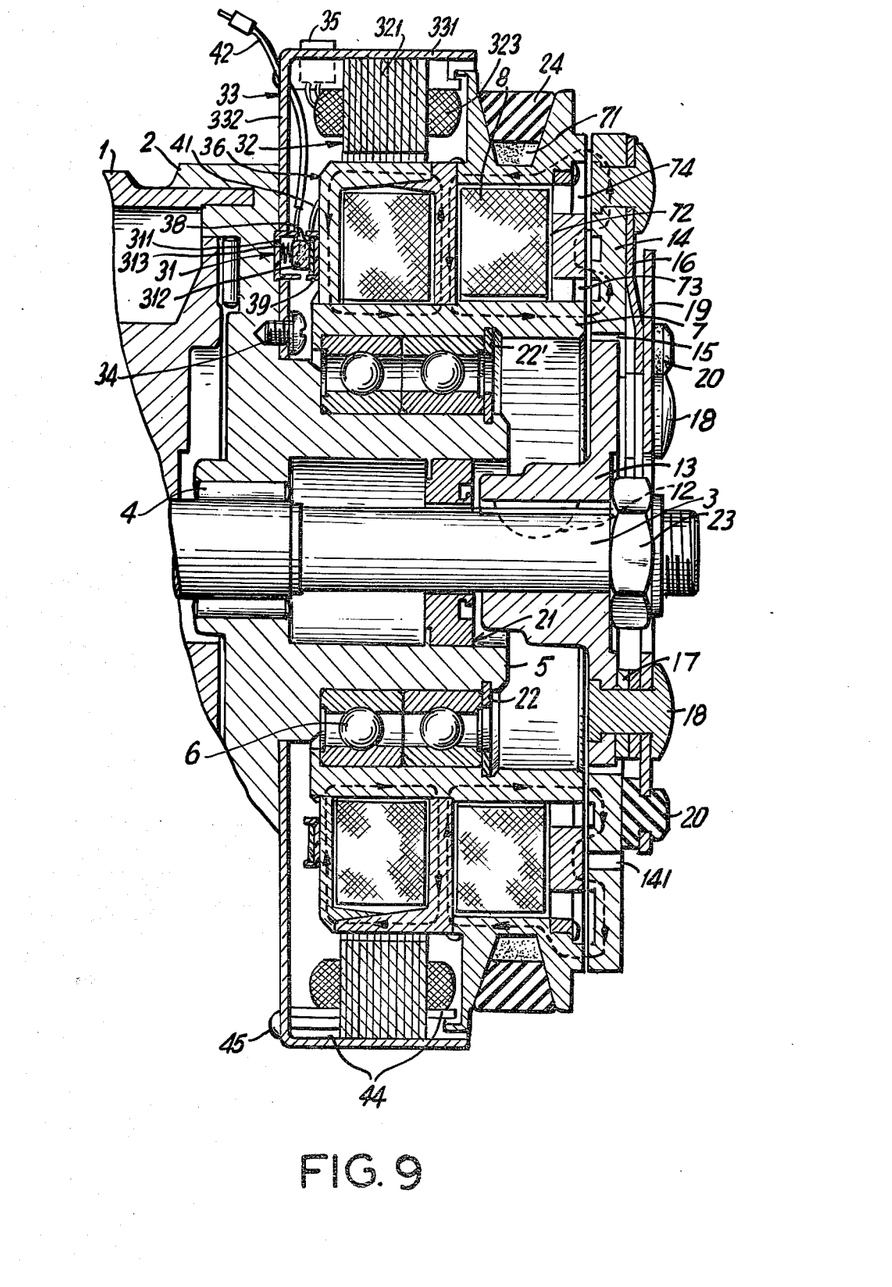
FIG. 9 is a cross sectional view of a main part of a refrigerant compressor according to still another embodiment of the invention.

In the embodiment of the invention shown in FIG. 9, an electromagnet device is used in place of the permanent magnet device. The structure of the electromagnetic clutch is similar as in the previously described embodiments except that the coil 8 is mounted on the rotating element 7. Therefore, a detailed description of the electromagnetic clutch of this embodiment is omitted for the sake of simplification and similar parts are represented by the same reference numerals as are used in FIGS. 1-8.

The coil 8 is mounted in the annular groove 72. Therefore, the coil 8 rotates together with the rotating elements. To feed an electric current to the coil 8, a brush means 31 is used, as will be described.

Accordingly, the operation of the electromagnetic clutch is similar to the previous embodiments.

An electric inducing coil device 32 is statically supported by a supporting member 33 which is secured to the front end plate 2 by bolt means 34. The supporting member 33 is a ring plate having an annular flange portion 331 which supports the electric inducing coil device 32 on its inner surface.

Figures 10, 11, 12:
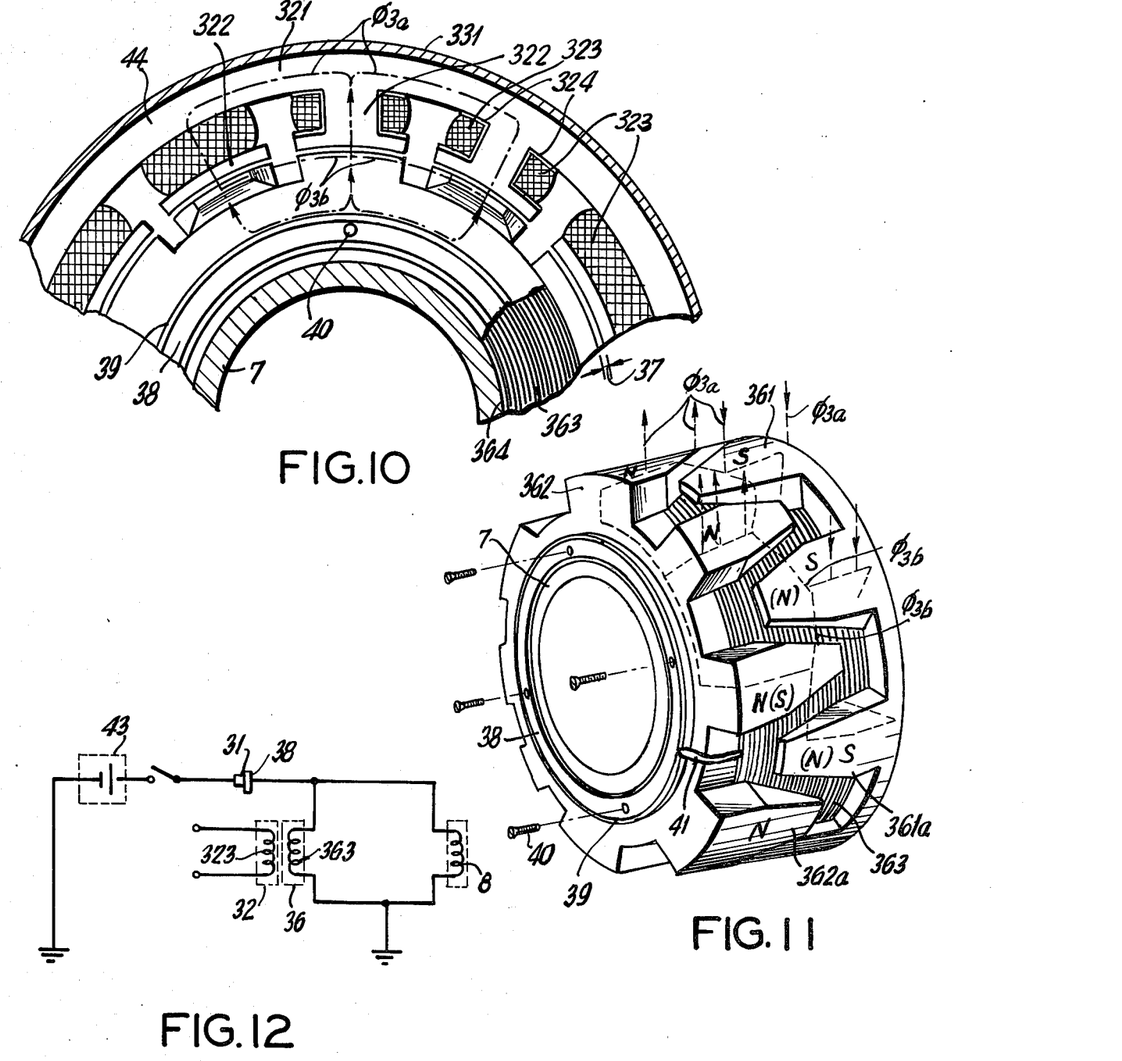
FIG. 10 is a front view of an AC generator comprising an electromagnet device as a rotor and a coil device as a stator in the compressor of FIG. 9.
FIG. 11 is a perspective view of the rotor in FIGS. 9 and 10.
FIG. 12 is an electric circuit diagram for feeding the electric source to the rotor and a coil of an electromagnetic clutch in FIG. 9 from a battery installed on a car.

Referring to FIG. 10, the electric inducing coil device 32 comprises an annular laminated magnetic yoke 321 having a plurality of pole pieces 322 which project in a radially inner direction, and coils or windings 323 wound on the pole pieces 322. The coils 323 are connected in series and the opposite ends are connected to an electric connector 35 which is mounted on the supporting member 33 (shown in FIG. 9). Between each coil 323 and the corresponding pole piece 322, an insulator paper 324 is interposed.

An electromagnet device 36 is mounted on the rotating member 7, in the fashion that the electromagnet device 36 is disposed within the annular electric inducing coil device 32 with an annular air gap 37 therebetween.

The electromagnet device 36 comprises two annular magnetic yokes 361 and 362 and an annular coil 363.

Referring to FIGS. 10 and 11, the yoke 361 is in the form of a magnetic ring having a plurality of angularly spaced projections 361a which axially extend from the radial outer end. The other yoke 362 is also of a magnetic ring having a plurality of similar projections 362a. The coil 363 is covered by an insulator paper 364 and is disposed between both yokes 361 and 362.

Yokes 361 and 362 are mounted on and fixed to the rotating member 7 by means of welding, such that each axial projection 362a of the yoke 362 is disposed between adjacent two axial projections 361a of the yoke 361 with an air gap, as shown in FIG. 11.

Referring to FIGS. 9 and 11, an electric conductive ring 38 is mounted on an outer end surface of the yoke 362. The conductive ring 38 is supported by a ring holder 39 and is secured to the yoke 362 by means of bolts 40.

The coils 363 and 8 are connected with the conductive ring 38. The connecting lead for the coil 363 is shown by 41 in FIG. 11.

The brush means 31 is mounted on the supporting member 32 against the conductive ring 38.

Referring to FIG. 9, a brush holder 311 supporting a brush 312 is fixed to the ring plate portion 332 of the supporting member 33. The brush 312 is connected to the holder 311 by a spring 313 to be urged to the conductive ring 38 so that the contact between the brush 312 and the conductive ring 38 is secured.

An electric feeding line 42, which is connected to the brush 312 through the spring 313, is led out from the brush holder and is connected to the battery of the car.

FIG. 12 shows an electric circuit comprising the battery 43, the brush means 31, the conductive ring 38, the electromagnet 36, and the coil 8.

Thus, the coils 363 and 8 are energized by the battery 43 through the brush means 31.

It will be understood that one lead end of each coil 8 and 363 is connected to the rotating member 7 as an earth terminal. If necessary, another pair of brush means and conductive ring may be provided in similar manner, for the one lead end of each coil 8 and 363.

The electric generation will be described referring to FIGS. 9-11.

When an electric current is fed through the feeding line 42, the brush means 31 and the conductive ring 38 to the coil 363, the induced magnetic flux flows through the yokes 361, 362 and a portion of the rotor 7, as indicated by the broken arrow line in the drawings. Accordingly, projections 362a of the yoke 362 serve as, for example, N-poles, and projections 361a of the other yoke serve as S-poles.

Now, assuming that projections 361a and 362a face pole pieces 322 of the electric inducing coil device 32, respectively, a portion $\phi_{3a}$ of the induced magnetic flux flows through the pole pieces 322 and the yoke 321, as shown in FIG. 10.

The other component $\phi_{3b}$ of the magnetic flux flows through air gap between projections 362a and 361a of yokes 362 and 361.

As will be noted, the magnetic flux $\phi_{3a}$ flows through adjacent two pole pieces 322 in opposite directions. Therefore, when the electromagnet device 36 rotates, the direction of the magnetic flux which flows through each pole piece 322 is alternatingly reversed. As a result, an AC current is induced on the coil 323 wound on the pole piece 322 due to the rotation of the electromagnet device 36.

Since all coils 323 are connected in series and are connected to the connector 35, the induced AC current is taken out from the connector 35.

Coils 323 wound on adjacent two pole pieces should be opposite to one another in the winding direction.

As shown in FIGS. 9 and 10, a fitting member 44 is provided to secure the electric inducing coil device 32 to the supporting member 33, in cooperation with bolt means 45.

As will be understood from above description, the number of pole pieces 322 of the yoke of the electric inducing coil device 32 is equal to the total number of the axial projections 361a and 362a of the yokes 361 and 362 of the electromagnet device 36.

Figure 13:
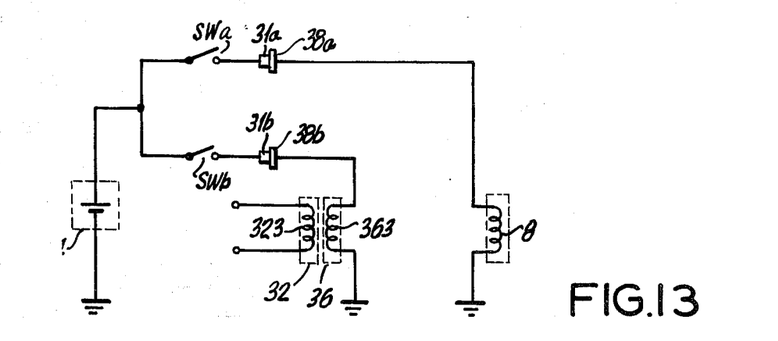
FIG. 13 is a circuit diagram of another electric feeding circuit to the rotor and the coil of the electromagnetic clutch.

In the embodiment of FIGS. 9–11, a pair of the brush means and the conductive ring is commonly used for feeding the electric power source to both coils 363 and 8. But it may be easily made that two pairs are provided for the electric feed to respective coils 363 and 8, as shown in FIG. 13. Namely, one pair of brush means 31a and conductive ring 38a is used for the coil 8 of the electromagnetic clutch, and the other pair of brush means 31b and conductive ring 38b is used for the coil 363 of the electromagnet device 36. In this modification, the operation of the electromagnetic clutch and the AC electric generator is independently controlled by use of the respective control switches SWa and SWb.

This invention has been described in detail in connection with preferred embodiments which are merely for exemplification. It will be noted by those skilled in the art that other various designations and modifications may be easily made within the scope of the invention.

What is claimed is:

1. A refrigerant compressor having an electromagnetic clutch for use in an automotive air conditioning refrigerating system, said compressor comprising:

a compressor body including a compressor housing, a rotatable shaft protruding from said compressor housing for driving a compressor piston within said compressor housing, and a sleeve extending from said compressor housing surrounding and concentric with said shaft;

an electromagnetic clutch device comprising a rotating member rotatably mounted on said sleeve and adapted to be driven by an automobile engine, said rotating member being provided with magnetic attraction surface, a magnetic armature connected to said shaft and magnetically associated with said magnetic attraction surface, and electromagnetic means associated with said rotating element for attracting said armature to said magnetic attraction surface to transmit the rotating force of said rotating member to said shaft; and an AC electric generator device comprising a rotor member mounted on said rotating member, and a stator member statically mounted on said compressor housing, one of said rotor member and said stator member being provided with magnetic pole pieces facing the other of said rotor member and said stator member with a gap arranged such that each two adjacent magnetic pole pieces are different in magnetic polarity from one another, and the other of said rotor member and said stator member including coil means in which electric currents are induced upon the rotation of said rotor member.

2. The refrigerant compressor of claim 1, in which said magnetic pieces comprise a plurality of permanent magnet elements arranged to form an annulus, the magnetic pole directions of adjacent pairs of said permanent magnet elements being disposed radially opposite to one another.

3. The refrigerant comprssor of claim 2, in which said coil means comprises an annular core including first and second annular yokes and an annular coil wound on said core.

4. The refrigerant compressor of claim 3, in which each of said first and second yokes includes a plurality of axial projections that extend radially beyond said coil, the axial projections of said first yoke being disposed between adjacent ones of said axial projections on said second yoke to form air gaps therebetween.

5. The refrigerant compressor of claim 1, in which said coil means comprises a ring core having a plurality of radial projections, and a plurality of coils respectively wound on said projections, said coils being connected in series, and means connected to the opposite ends of said series-connect coils for taking out AC current induced in said coils.

6. The refrigerant compressor of claim 1, in which said magnetic pieces comprise an electromagnet device comprising an annular core formed with first and second annular yokes, an annular coil wound on said core, each of said yokes including a plurality of axial projections extending over said coil, said axial projections of one of said first and second yokes being disposed between adjacent pairs of said axial projections of the other of said first and second yokes and establishing air gaps therebetween.

7. The compressor of claim 6, further comprising brush means for applying electrical power from the car battery to said annular coil.

8. The compressor of claim 6, in which said coil means includes a coil device surrounding said electromagnet device and secured to said compressor housing, said coil device comprising a ring core having a plurality of radial outer projections, a plurality of coils respectively wound on said radial projections and connected in series, and means connected to the ends of said series-connected coils for taking out the AC current induced in said coils.

* * * * *